(12) United States Patent
Ross et al.

(10) Patent No.: US 10,493,519 B2
(45) Date of Patent: Dec. 3, 2019

(54) MOLDS AND PUNCHES FOR MAKING FASTENERS AND TOOLS

(71) Applicant: Phillips Fastener, LLC, Council Bluffs, IA (US)

(72) Inventors: Michael J Ross, Council Bluffs, IA (US); Chen Hung Lin, Taiepei/Taiwan (CN); Kuo Yung Yu, Changhua County/Taiwan (CN)

(73) Assignee: Phillips Fastener, LLC, Council Bluffs, IA (US)

( * ) Notice: Subject to any disclaimer, the term of this patent is extended or adjusted under 35 U.S.C. 154(b) by 144 days.

(21) Appl. No.: 15/621,838

(22) Filed: Jun. 13, 2017

(65) Prior Publication Data

US 2018/0354022 A1    Dec. 13, 2018

(51) Int. Cl.
| | |
|---|---|
| B21K 1/46 | (2006.01) |
| B25B 15/00 | (2006.01) |
| F16B 23/00 | (2006.01) |

(52) U.S. Cl.
CPC ............ B21K 1/463 (2013.01); B25B 15/005 (2013.01); F16B 23/003 (2013.01)

(58) Field of Classification Search
CPC ........ B21K 1/46; B21K 1/463; B25B 15/005; F16B 23/003
See application file for complete search history.

(56) References Cited

U.S. PATENT DOCUMENTS

| | | | | |
|---|---|---|---|---|
| 3,238,540 A | * | 3/1966 | Muenchinger | B21K 1/463 470/63 |
| 3,972,083 A | * | 8/1976 | Dreger | B21K 1/463 470/63 |
| 4,970,922 A | * | 11/1990 | Krivec | B25B 15/005 81/451 |
| 5,279,190 A | * | 1/1994 | Goss | B25B 13/065 411/403 |
| 5,509,334 A | | 4/1996 | Shinjo | |
| 6,945,142 B1 | * | 9/2005 | Chen | B25B 13/06 81/124.3 |
| 8,955,417 B2 | | 2/2015 | Stiebitz et al. | |
| 9,067,307 B2 | | 6/2015 | Kozak | |
| 9,562,557 B2 | * | 2/2017 | Ross | F16B 23/003 |
| 2012/0137842 A1 | * | 6/2012 | Guo | B25B 15/005 81/460 |
| 2018/0347611 A1 | * | 12/2018 | Tsai | F16B 23/0023 |

FOREIGN PATENT DOCUMENTS

| | | |
|---|---|---|
| CN | 102791432 A | 11/2012 |
| CN | 102791432 B | 11/2015 |
| CN | 205436820 | 8/2016 |

OTHER PUBLICATIONS

Taiwanese Office Action, dated Dec. 5, 2017.

* cited by examiner

*Primary Examiner* — Edward T Tolan
(74) *Attorney, Agent, or Firm* — Michael P. Mazza, LLC

(57) ABSTRACT

A mold, punch and workpiece are provided. In a preferred embodiment, a tapering outer edge is provided, along with a plurality of rib sets arranged circumferentially about the outer edge, and a ramp. A ramp may be located to facilitate the removal of burrs. Various slot patterns may be provided or formed, including star-shapes/Torx® slots. Using the present invention, a driver bit may be more securely fit to the slot of a screw, for example, allowing the screw to be threaded into a machined part more securely and smoothly, reducing rocking, shaking or tilt.

11 Claims, 4 Drawing Sheets

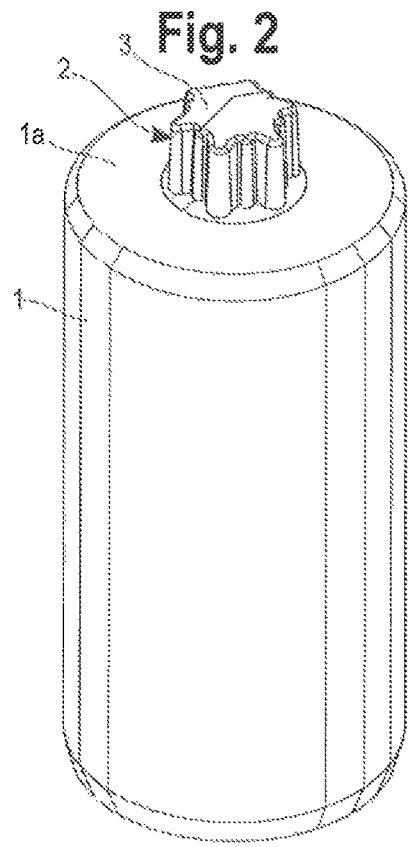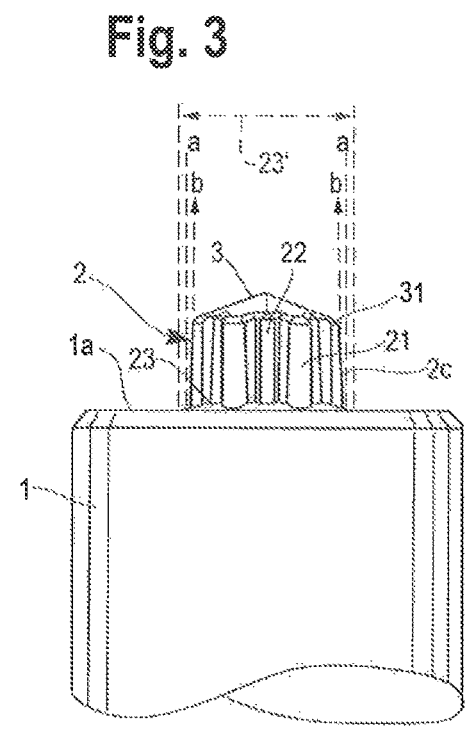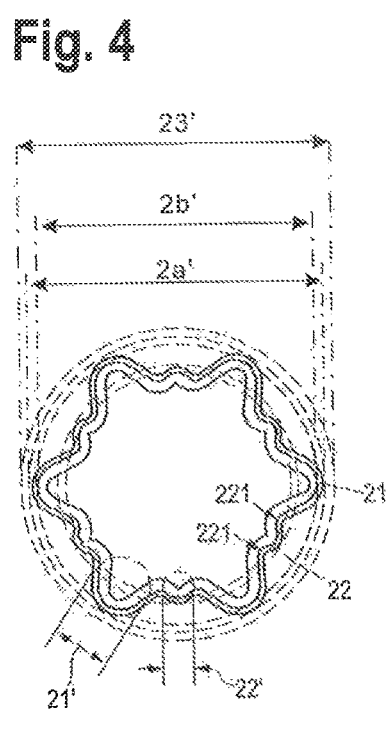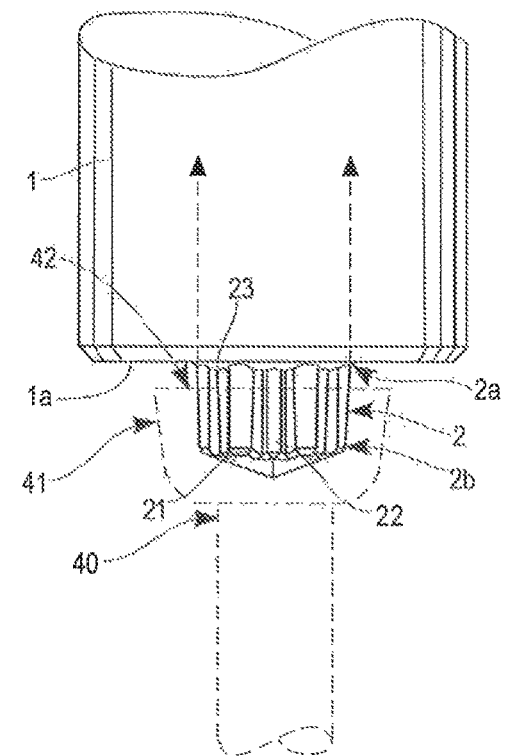

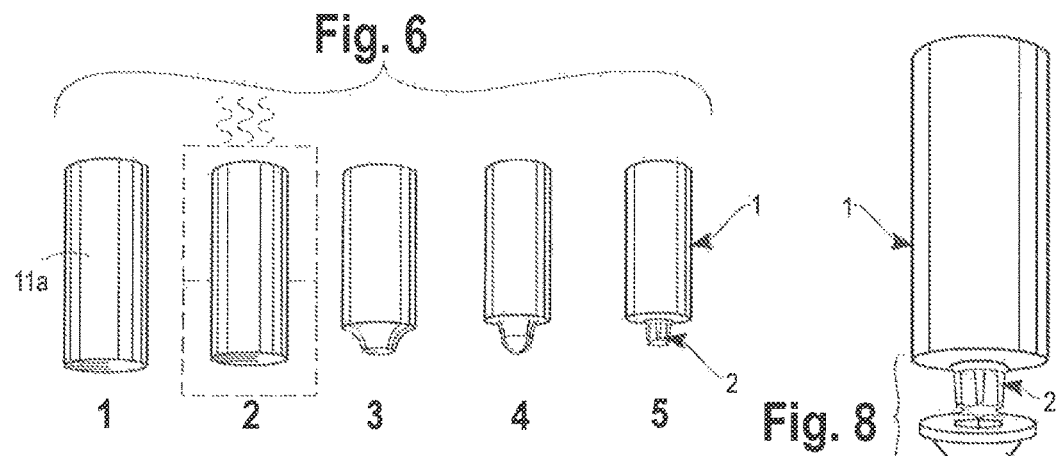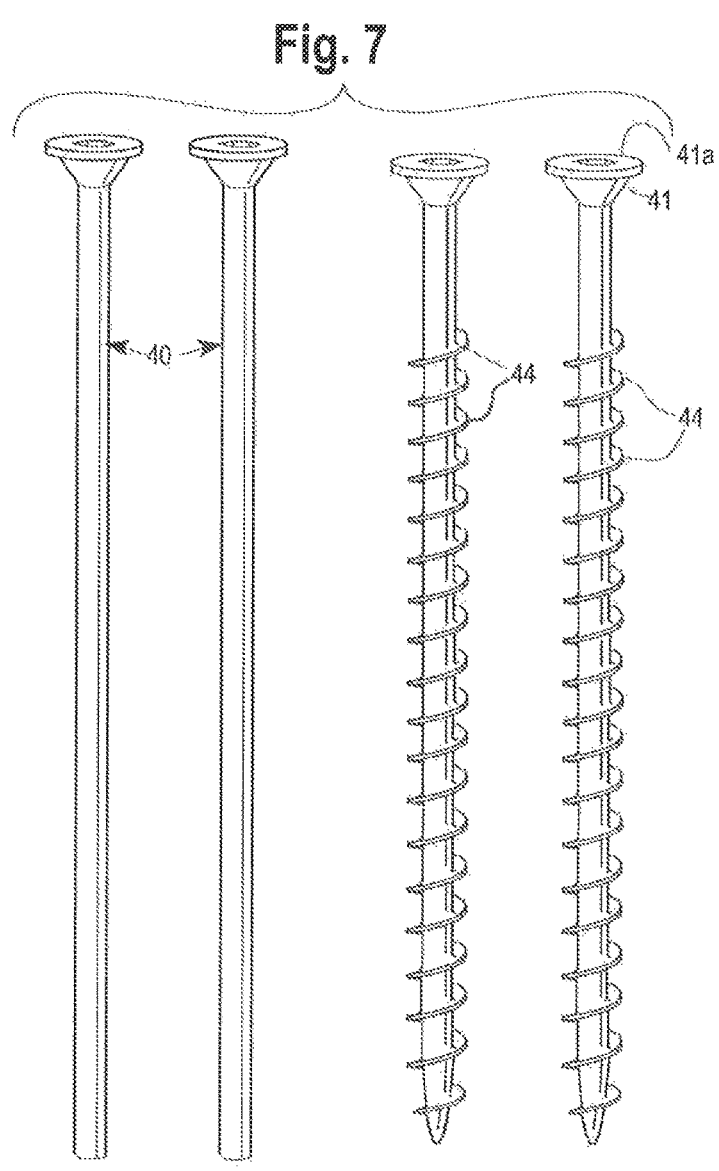

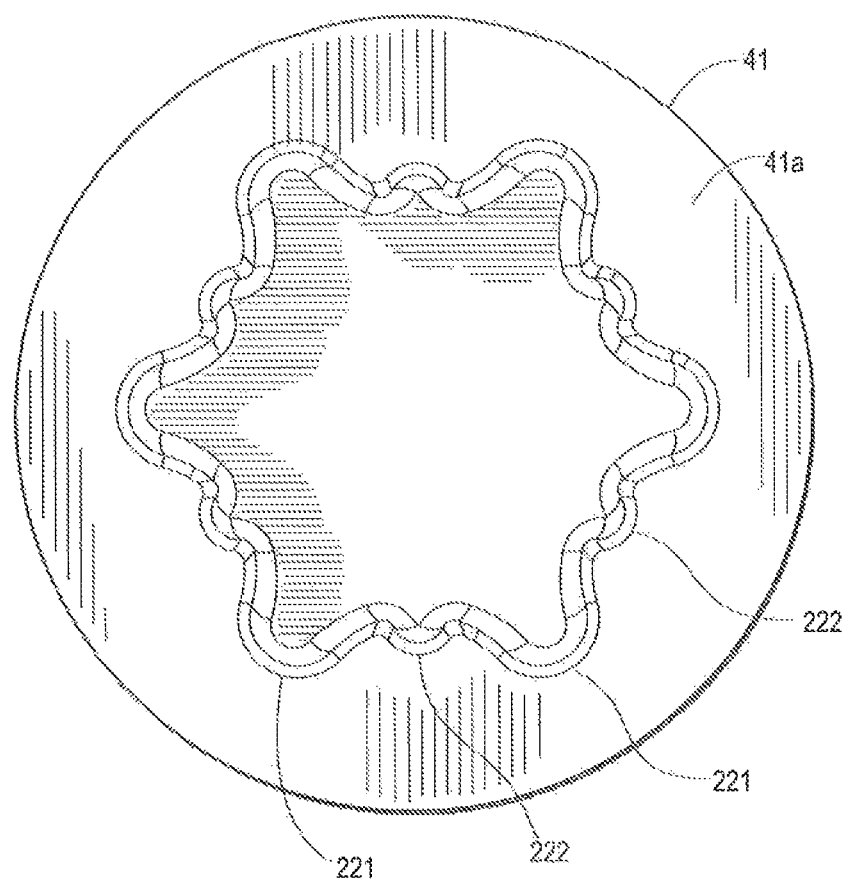

MOLDS AND PUNCHES FOR MAKING FASTENERS AND TOOLS

BACKGROUND OF THE INVENTION

The present invention generally relates to molds and punches, and the fasteners, screwdriver heads and bits made using them, which employ a Torx®-shaped slot.

As background, drawn wire is pulled to a certain thickness or gauge, and a "header" punch is used to form the head and length of the screw. Threads are formed on the length of the screw using a rolling die. A slot may be formed on the screw head, typically using a stamping process. The stamping process may be a two-stage forming process, utilizing "primary" punches and "secondary" punches. The primary punch provides a positioning-point slot for positioning the secondary stamping. The secondary punch provides the secondary stamping, which forms the slot on the head of the fastener, for example. If the slot is properly designed, a driver bit may be inserted into and fit to the slot in a secure and stable manner, so that the driver bit can be used to firmly and securely rotate the fastener.

The shape of the slot of screws can be slotted, crossed, hexagonal, Torx®, etc. The so-called Torx® slot is a star-shaped slot with at least 6 lobes. As background, Torx®-head screws resist cam-out better than Phillips-head or slot-head screws. While Phillips heads were designed to cause the driver to cam-out, to prevent overtightening, Torx® heads were designed to prevent cam-out. Thus, rather than rely on the tool to slip out of the screw head when a predetermined torque level is reached, which risks damage to the driver tip, screw head and/or workpiece, torque-limiting driver designs achieve a desired torque consistently. The Torx® design allows for a higher torque to be exerted than a similarly-sized conventional hex socket head without damaging the head and/or the tool.

Prior art FIG. 1A shows a conventional hex slot 10, while prior art FIG. 1B shows a Torx® slot 15. Circle 12, passing through the six points of contact between the driver and the slot of the screw/tool head, represents the direction of the rotational force being exerted at each of those points. (The clearance between the components is exaggerated for clarity.) Because the plane of contact is not perpendicular to this circle, a radial force is also generated which tends to "burst" the female component and "crush" the male one. If this radial force component is too great for the material to withstand, it will cause the corners to be rounded off one or both components, or will split the sides of the female part. The magnitude of this force is proportional to the cotangent of the angle β between circle 12 and the contact plane. As seen by a comparison of FIGS. 1A and 1B, the angle between the plane of contact between the tool and the fastener head, and the circumferentially-directed force, angle β, is much closer to 90° for a Torx®-type head, and so for a given torque the potentially damaging radial force is much lower.

Despite its advantages, the Torx® slot has various shortcomings. For example, when a star screwdriver is plugged into the Torx® slot, it is more difficult to align the screwdriver with the slot as compared with slots of other shapes. The Torx® slot also requires more locking points, requiring a higher precision than a common crossed-slot or slotted-slot. Additionally, a screwdriver can easily be rocked or shaken, due to insufficient precision, when plugged into a Torx® slot. Problems are also often encountered during stamping of the Torx® slot, typically due to poor design of the stamping die, as further discussed below.

During stamping of the Torx® slot, a stamping die with a poor design can cause errors in the slot that is formed. Some slots have larger openings than desired, while other slots may have curved side walls. In either case, a screwdriver bit may be shaken or loosened when inserted within the screw slot. Accordingly, there is a need for manufacturers to improve the design of stamping dies used to manufacture Torx® slots on the heads of fasteners and tools such as screwdrivers and bits.

U.S. Pat. No. 8,955,417 discloses a rotary drive design for a tool and for a workpiece to be rotationally driven, including a stamping die for making generally Torx®-slotted fastener heads. Screws or drivers have a manufacturing tolerance difference or gap between the torque-receiving surface of the screwdriver (tool) and the torque transmission surface of the screw slot (workpiece). During use of the rotary drive, this gap can cause the tool to be subjected to forces running transverse to the rotational axis; these transverse forces can reduce the driving speed, and can cause the screw to be threaded into the workpiece at an oblique angle to the longitudinal axis of the workpiece.

The basic cylindrical shape of the rotary drive shown in the '417 Patent has a plurality of rounded projections, and rounded recesses arranged between these projections. The outermost surfaces of the projections tangentially form a circle having a maximum radius, while the innermost surfaces of the recesses tangentially form a circle having a minimum radius. Deviating from this cylindrical basic shape, the regions between the projections form conical surfaces, which are not instrumental in the transmission of torque, but act to center and align the tool with the workpiece.

Still referring to the '417 Patent, the male die is used to press a metal blank, deforming the metal blank in a given direction under controlled pressure. In order to reduce scrape generated due to metal overflow in the slot, a flash groove is disposed on the punch. However, the flash groove lowers the precision of the stamped slot, because the die cavity is not filled. With the male die of the '417 Patent, the projection is vertically oriented, while the conical surface is used to guide metal flow. The slope of the conical surface is quite large. During the stamping, the vertical projection leaves no more space for metal to flow, yet the conical surface provides too much space for the overflow, due to the large slope of the conical surface. Accordingly, because the space in the die cavity is not distributed evenly, burrs form at the edge of the projection. This results in the need for a secondary processing in order to remove the burrs. In the conical surface, the die cavity is unable to be refilled. Thus, not only is precision reduced, but the tool and the workpiece may not be smoothly matched to each other.

SUMMARY OF THE INVENTION

The objects mentioned above, as well as other objects, are solved by the present invention, which overcomes disadvantages of molds and stampings for making Torx®-shaped slots on fasteners and tools, while providing new advantages not previously associated with them.

Accordingly, a primary object of the present invention is to provide a new mold for making a secondary stamping of a screw, bit or other device which enables a Torx® slot formed on the screw head to be more precise, and without the need for any secondary processing, such as the removal of burrs. The preferred mold includes main ribs and subribs arranged circularly to form a conical frustum, that forms the shape of the fastener head. The main ribs and the subribs are preferably inclined at an angle to provide more spaces to allow metal being stamped to flow within these spaces, filling the surface of the Torx® slot formed by this stamping. A side surface of the slot formed by this stamping is vertically oriented, and no burrs are formed on the edges of the slot.

In a preferred embodiment, a mold for stamping a screw to form a star-shaped slotted head is provided. The mold preferably includes a generally cylindrical main body having a generally planar top surface, and a punch integrally extending from the generally planar surface. The punch preferably includes a plurality of rib sets arranged circumferentially about an outer edge of the punch. Each rib set preferably includes at least one main rib adjacent at least one subrib. A ramp may be formed between the punch and the flat surface.

In a particularly preferred embodiment, the punch may be tapered from a first, lower end to a second, upper end, such as at an angle of between about 2-3° degrees; also, the diameter of the first end of the punch may be larger than a diameter of the second end of the punch. The main rib and the subrib may be inclined at a similar range of angles. A diameter of the ramp may be larger than the diameter of the first end of the punch. A ratio of a width of an arc of the main rib to a width of an arc of the subrib is preferably between about 1.5:1 and 2:5, and most preferably 2:1. A curved groove may be arranged between the main rib and the subrib of each rib set, connecting the main rib and the subrib using a rounded angle.

In one preferred embodiment, the punch is frustoconically-shaped, and the main rib, the curved groove and the subrib are connected in turn repetitively to participate in the formation of a multi-rib conical frustum. A conical head may extend from a distal end of the punch, and a smooth edge may be formed between the conical head and the distal end.

In another embodiment of the invention, a mold for stamping a screw with a slotted head, such as with a star-shaped pattern, may be provided. The mold may have a main body with a generally planar top surface. A punch may integrally extend from the generally planar top surface. The punch may have a plurality of rib sets arranged circumferentially about an outer edge of the punch. Each rib set may include at least one main rib adjacent at least one subrib. The punch may have a tapered portion with an outer edge that inwardly tapers from a lower end of the outer edge to an upper end of the outer edge, causing at least a portion of the punch to have a generally frustoconical shape. The punch may also have a distal end with a generally conical head. In one preferred embodiment, the outer edge of the tapered portion of the punch may form an angle of between about 2-3° with a longitudinal axis parallel to a length of the mold. A ramp may be formed between the punch and the generally planar top surface of the mold; a ramp diameter may be larger than a diameter of the outer edge of the punch. A ratio of a width of an arc of the main rib to a width of an arc of the subrib is preferably between about 1.5:1 and 2:5, and most preferably about 2:1. A curved groove forming a rounded angle may be arranged between the main rib and the subrib of each rib set, connecting the main rib and the subrib. The main rib, the curved groove and the subrib of each rib set may be connected in turn, repetitively, to form a multi-rib conical frustum for a portion of the punch. A smooth edge may be formed between the generally conical head and the distal end.

In yet another embodiment of the invention, a punch may be provided that extends from a mold for stamping a screw with a slotted head, such as with a star-shaped pattern. The punch may include a plurality of rib sets arranged circumferentially about an outer edge of the punch; each rib set may include at least one main rib adjacent at least one subrib. The punch may have a tapered portion such that an outer edge of the punch inwardly tapers from a lower end of the outer edge to an upper end of the outer edge, causing at least a portion of the punch to have a generally frustoconical shape. The outer edge of the tapered portion of the punch may form an angle of between about 2-3° with a longitudinal axis parallel to a length of the mold. A curved groove may be arranged between the main rib and the subrib of each rib set, connecting the main rib and the subrib; a ratio of a width of an arc of the main rib to a width of an arc of the subrib is preferably between about 1.5:1 and 2.5:1, and most preferably about 2:1. The punch may include a distal end with a generally conical head, and a smooth edge may be formed between the generally conical head and the distal end.

In yet another embodiment of the invention, a workpiece is provided that may be rotated or rotationally driven. The workpiece may include an outer edge that inwardly tapers from a lower end of the outer edge to an upper end of the outer edge; and a plurality of rib sets arranged circumferentially about the outer edge, with each rib set including at least one main rib adjacent at least one subrib. The rib sets may form a star-shaped pattern, for example. In a preferred embodiment, the outer edge of the workpiece may be tapered, and may form an angle of between about 2-3° with a longitudinal axis parallel to a length of the workpiece. In a particularly preferred embodiment, a ratio of a width of an arc of the main rib to a width of an arc of the subrib is preferably between about 1.5:1 and 2.5:1, and most preferably about 2:1. The workpiece may include an end with either a generally conical head, or a generally inverted conical shape; a smooth edge may be formed on the generally conical head or the generally inverted conical shape. A curved groove may be arranged between the main rib and the subrib of each rib set, connecting the main rib and the subrib.

DEFINITION OF CLAIM TERMS

The terms used in the claims are intended to have their broadest meaning consistent with the requirements of law. Where alternative meanings are possible, the broadest meaning is intended. All words used in the claims are intended to be used in the normal, customary usage of grammar and the English language.

"Torx®" means a generally star-shaped pattern for a screw head which uses 6 lobes.

"Workpiece" means a fastener, screwdriver head, bit, or other device for applying or receiving rotational force.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 2 is a top and side perspective view of a die for stamping fasteners heads, screwdriver heads and bit;

FIG. 3 is a partial side perspective view of the die shown in FIG. 2; a

FIG. 4 is a top view of an inner portion of the stamping die shown in FIG. 2;

FIG. 5 is a side perspective view of the stamping die shown in FIG. 2, punching into a fastener mold (shown in dotted lines);

FIG. 6 are perspective views showing the evolution of the manufacture of the stamping die, with the left-most view being the original cylinder, and the right-most view being the final stamping die/punch;

FIG. 7 shows perspective views of fasteners made using the stamping die of the present invention;

FIG. 8 is a perspective view showing the stamping die inserted into the head of a fastener, forming the Torx-shaped recess; and FIG. 9 is a top perspective view of the head of a fastener according to the present invention.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1A:
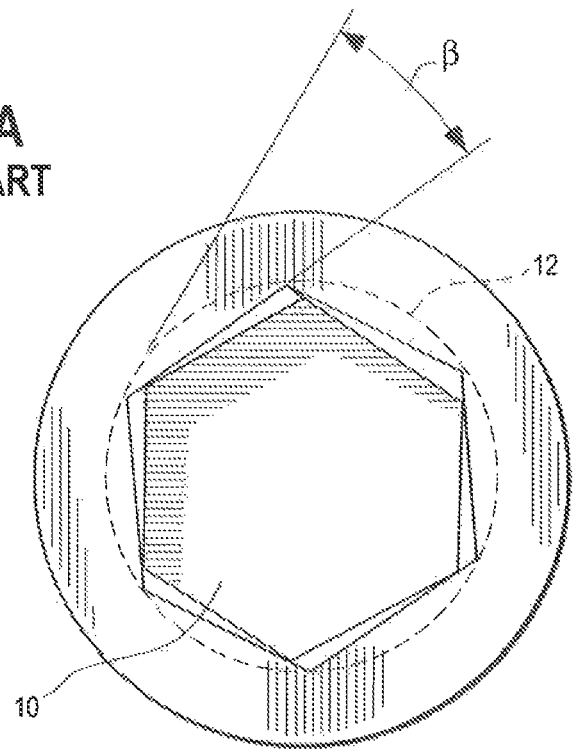
FIGS. 1A and 1B are prior art hexagonal-shaped and Torx®-shaped slots, respectively, in a fastener head.
Figure 1B:
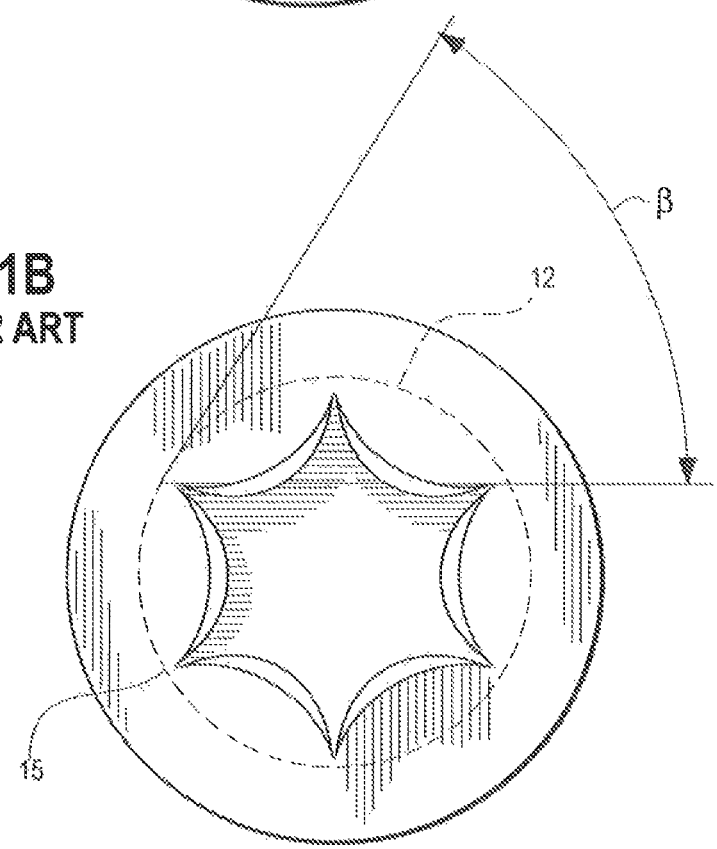

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

In a preferred embodiment of the present invention, and now referring to FIGS. 2-3, a mold for manufacturing a secondary stamping of screws according to the present invention includes: a main body 1 with a top planar surface 1a, and a punch 2 with a frustoconical head 3. The main body 1 forms a cylinder, with an upper flat surface 1a disposed on top of the main body 1. The punch 2 may be integrally formed with the main body, extends from the flat surface 1a, and includes a plurality of rib sets arranged circumferentially about the punch.

Referring now to FIGS. 2-4, each lobe of the Torx® slot preferably includes a rib set, consisting of at least one main rib 21 and at least one adjacent subrib 22. A ramp 23, with an outer ramp diameter 23', may be formed between punch 2 and flat surface 1a. A first end 2a of the punch, formed by ramp 23, may extend axially to form a second end 2b of the punch. As shown at FIG. 3, outer edge 2c (line "b") of the punch may be inclined about 2-3° relative to the longitudinal axis "a" of the mold, i.e., the angle between lines "a" and "b" may be about 2-3°. (Vertical axis "a" is a line parallel to the longitudinal axis of the mold, while vertical axis "b" is coincident with inclined, outer edge 2c of punch 2.) In other words, punch 2 slightly inwardly tapers from first end 2a to second end 2b at an angle of about 2-3°.

Referring to FIGS. 2-4, main ribs 21 and subribs 22 are arranged circumferentially in a frustoconical shape. Referring to FIGS. 3-4, the diameter of the first end 2a of the punch (i.e., the distance between lines a-a, or 2a' on FIG. 4) is larger than the diameter of the second end 2b of the punch (i.e., the distance between lines b-b, or 2b' on FIG. 4). The inclination angle of the main rib 21 and that of the subrib 22 may be the same. The diameter (23') of the ramp 23 (see FIG. 2) is larger than the diameter (2a') of the first end 2a.

Referring to FIG. 4, a preferred ratio of the width of an arc 21' of the main rib 21 to the width of an arc 22' of the subrib 22 is between about 1.5:1 and 2.5:1, while an optimal ratio has been found to be about 2:1. A curved groove 221 may be arranged between the main rib 21 and the subrib 22 for connecting the main rib 21 and the subrib 22. Thus the main rib 21, the curved groove 221, and the subrib 22 may be connected in turn, repetitively, to form a multi-rib conical frustum. Both the main rib 21 and the subrib 22 may be inclined 2-3° to the vertical axis "a" so as to form a conical frustum. The conical head 3 may be extended from second end 2b of punch 2. A smooth edge 31 (FIG. 2) formed by polishing may be located between the conical head 3 and the second end 2b. Second end 2b of punch 2 is extended to form smooth edge 31, and smooth edge 31 is further extended to form conical head 3.

Referring to FIG. 5, second end 2b of punch 2 is shown gradually stamping down into a screw head 41 of metal fastener blank 40 to form a slot in the fastener head. Because the diameter of second end 2b of the punch is smaller than the diameter of first end 2a, metal from metal blank 40 being stamped initially flows along the inclined outer edge 2c of punch 2 (see FIG. 3), and air inside the slot can be pushed out smoothly along outer edge 2c during the stamping process. As first end 2a of punch 2 is in contact with screw head 41 and punch 2 arrives at the bottom of the slot, a portion of the metal blank is pushed upward and fills into a side surface of an upper part of the slot. Thus the side surface of the slot formed by stamping is parallel to vertical axis "a". Once flat surface 1a of the mold contacts screw head surface 41a, any metal burrs that may be formed to this point are squeezed back to an edge of the slot by flat surface 1a working together with ramp 23. As this edge is flat and even, no burrs are left. Accordingly, the slot produced by this stamping is more precise, and no secondary processing for burr removal is required.

FIG. 6 shows the evolution of a main body (solid cylinder) or blank 11a to a main body 1 with a punch 2. FIG. 7 shows fastener blanks 40 and finished fasteners 40 with threads 44, and fastener heads 41 with a top surface 41a.

Referring now to FIG. 9, the top surface 41a of the head of a fastener 41 is shown. The Torx® slot is a mirror image of punch 2 which forms it, and includes main ribs 221 and sub-ribs 222.

It will now be appreciated that the present invention has at least the following advantages, as well as others not mentioned here that artisans will or may realize:

A. Punch 2 is tapered from first end 2a to second end 2b at an angle of 2-3°, which allows air to be pushed out during stamping of the blank, without generating an enlarged hole.

B. Curved groove 221 arranged between main rib 21 and subrib 22 allows the main rib 21 and the subrib 22 to be more prominently exposed and, thus, defined clearly.

C. The ratio of the width of an arc 21' of the main rib 21 to the width of an arc 22' of the subrib 22 is preferably between about 1.5:1 and 2.5:1, and is optimally about 2:1. 2:1 has been found to be the optimal ratio, causing the torque force of a drive bit to be increased.

D. Curved groove 221, which is a rounded angle between main rib 21 and subrib 22, not only reduces abrasion of the screw driver bit, but also prolongs service life of the screw driver.

E. Smooth edge 31, extending from second end 2b of punch 2, reduces abrasion on punch 2, extending the service life of the punch.

F. Ramp 23 renders the appearance of the slot formed by stamping more aesthetically pleasing and symmetrical, while reducing burrs.

The above description is not intended to limit the meaning of the words used in the following claims that define the invention. Persons of ordinary skill in the art will understand that the examples disclosed here, as well as a variety of other examples and designs still falling within the scope of the following claims, may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

What is claimed is:

1. A mold for stamping a screw with a generally star-shaped slotted head, comprising:
   a cylindrical main body having a planar top surface;
   a punch integrally extending from the planar surface, the punch comprising a plurality of rib sets arranged circumferentially about an outer edge of the punch, wherein each rib set includes at least one main rib adjacent at least one subrib; and
   wherein the punch is tapered from a first, lower end to a second, upper end at an angle of between about 2-3° degrees, and a diameter of the first end is larger than a diameter of the second end;
   a ramp formed between the punch and the flat surface, wherein a diameter of the ramp is larger than the diameter of the first end of the punch;
   wherein the main rib and the subrib of each rib set are inclined at a similar angle, and wherein a ratio of a width of an arc of the main rib to a width of an arc of the subrib within each rib set is between about 1.5:1 and 2.5:1.

2. The mold of claim 1, wherein a curved groove is arranged between the main rib and the subrib of each rib set, connecting the main rib and the subrib, wherein the curved groove comprises a rounded angle, and wherein the ratio of the width of the arc of the main rib to the width of the arc of the subrib within each rib set is about 2:1.

3. The mold of claim 1, wherein the punch is frustoconically-shaped, and the main rib, the curved groove and the subrib within each rib set are connected in turn, repetitively, to participate in the formation of a multi-rib conical frustum.

4. The mold of claim 1, wherein a conical head extends from a distal end of the punch, and a smooth edge is formed between the conical head and the distal end.

5. A mold for stamping a screw with a slotted head having a generally star-shaped pattern, comprising:
   a main body having a planar top surface;
   a punch integrally extending from the planar top surface, the punch comprising a plurality of rib sets arranged circumferentially about an outer edge of the punch, wherein each rib set includes at least one main rib adjacent at least one subrib, and wherein a curved groove is arranged between the main rib and the subrib of each rib set, connecting the main rib and the subrib;
   wherein the punch has a tapered portion comprising an outer edge of the punch that inwardly tapers from a lower end of the outer edge to an upper end of the outer edge, causing at least a portion of the punch to have a frustoconical shape; and
   a ramp formed between the punch and the planar top surface of the punch, wherein a diameter of the ramp is larger than the diameter of the outer edge of the punch.

6. The mold of claim 5, wherein the punch comprises a distal end with a conical head.

7. The mold of claim 5, wherein the outer edge of the tapered portion of the punch forms an angle of between about 2-3° with a longitudinal axis parallel to a length of the mold.

8. The mold of claim 5, wherein a ratio of a width of an arc of the main rib to a width of an arc of the subrib is between about 1.5:1 and 2.5:1.

9. The mold of claim 5, wherein main rib, the curved groove and the subrib of each rib set are connected in turn to an adjacent rib set, repetitively, to form a multi-rib conical frustum for a portion of the punch.

10. The mold of claim 6, wherein a smooth edge is formed between the conical head and the distal end.

11. A punch extending from a mold for stamping a screw with a slotted head to form a generally star-shaped pattern, comprising:
    a plurality of rib sets arranged circumferentially about an outer edge of the punch, wherein each rib set includes at least one main rib adjacent at least one subrib, and wherein the punch has a tapered portion comprising an outer edge of the punch that inwardly tapers from a lower end of the outer edge to an upper end of the outer edge, causing at least a portion of the punch to have a frustoconical shape;
    a ramp formed between the punch and the outer edge of the punch, wherein a diameter of the ramp is larger than the diameter of the outer edge of the punch; and
    further comprising a curved groove arranged between the main rib and the subrib of each rib set, connecting the main rib and the subrib, and wherein a ratio of a width of an arc of the main rib to a width of an arc of the subrib, for each rib set, is about 2:1.

* * * * *